US008325863B2

(12) United States Patent
Stamoulis et al.

(10) Patent No.: US 8,325,863 B2
(45) Date of Patent: Dec. 4, 2012

(54) DATA DETECTION AND DECODING WITH CONSIDERATIONS FOR CHANNEL ESTIMATION ERRORS DUE TO GUARD SUBBANDS

(75) Inventors: Anastasios Stamoulis, San Diego, CA (US); Dung N. Doan, San Diego, CA (US); Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 768 days.

(21) Appl. No.: 11/248,975

(22) Filed: Oct. 11, 2005

(65) Prior Publication Data

US 2006/0078075 A1 Apr. 13, 2006

Related U.S. Application Data

(60) Provisional application No. 60/618,345, filed on Oct. 12, 2004.

(51) Int. Cl.
*H03D 1/06* (2006.01)

(52) U.S. Cl. ........ 375/348; 375/316; 375/343; 375/346; 375/347; 375/349; 370/208; 370/210; 370/342

(58) Field of Classification Search .................. 375/149, 375/222, 260, 295, 316, 327, 340, 358, 341, 375/343, 324, 360, 349, 348, 49, 350
See application file for complete search history.

(56) References Cited

U.S. PATENT DOCUMENTS

| | | | | |
|---|---|---|---|---|
| 5,852,630 A | * | 12/1998 | Langberg et al. ............. | 375/219 |
| 6,442,130 B1 | | 8/2002 | Jones, IV et al. ............. | 370/208 |
| 6,661,832 B1 | | 12/2003 | Sindhushayana et al. .... | 375/144 |
| 6,829,307 B1 | * | 12/2004 | Hoo et al. ..................... | 375/260 |
| 7,590,188 B2 | * | 9/2009 | Giannakis et al. ............ | 375/295 |
| 2003/0086504 A1 | | 5/2003 | Magee et al. | |
| 2004/0086027 A1 | * | 5/2004 | Shattil ........................... | 375/146 |
| 2004/0086055 A1 | * | 5/2004 | Li ................................. | 375/260 |
| 2004/0114675 A1 | * | 6/2004 | Crawford ...................... | 375/149 |
| 2004/0120411 A1 | * | 6/2004 | Walton et al. ................. | 375/260 |
| 2004/0125742 A1 | * | 7/2004 | Schmidt ........................ | 370/208 |
| 2004/0161046 A1 | * | 8/2004 | Schott et al. .................. | 375/260 |

(Continued)

FOREIGN PATENT DOCUMENTS

WO 02093859 11/2002

OTHER PUBLICATIONS

International Search Report—PCT/US2005/037077, International Search Authority—European Patent Office—Mar. 22, 2006.

(Continued)

*Primary Examiner* — Hirdepal Singh
(74) *Attorney, Agent, or Firm* — Abdollah Katbab

(57) ABSTRACT

Techniques for performing data detection and decoding in a manner to account for guard subbands are described. A receiver obtains received pilot symbols for pilot subbands and received data symbols for data subbands. Channel estimates are derived based on the received pilot symbols with zeroed-out pilot subbands filled with zeros. Data detection is performed on the received data symbols with the channel estimates to obtain data symbol estimates. Estimates of noise and estimation errors due to the zeroed-out pilot subbands are derived. LLRs are then computed based on the data symbol estimates, the channel estimates, and the estimates of the noise and estimation errors. The LLRs are deinterleaved and decoded to obtain decoded data.

15 Claims, 4 Drawing Sheets

U.S. PATENT DOCUMENTS

| | | | | |
|---|---|---|---|---|
| 2004/0228423 | A1* | 11/2004 | Gueguen | 375/341 |
| 2005/0135324 | A1* | 6/2005 | Kim et al. | 370/343 |
| 2005/0135509 | A1* | 6/2005 | Mantravadi et al. | 375/340 |
| 2006/0133259 | A1* | 6/2006 | Lin et al. | 370/208 |
| 2006/0291578 | A1* | 12/2006 | Singh et al. | 375/260 |
| 2009/0262859 | A1* | 10/2009 | Trachewsky et al. | 375/267 |

OTHER PUBLICATIONS

Written Opinion—PCT/US2005/037077, International Search Authority—European Patent Office—Apr. 12, 2007.

Taiwan Search Report—TW094135543—TIPO—Jan. 13, 2012.

* cited by examiner

DATA DETECTION AND DECODING WITH CONSIDERATIONS FOR CHANNEL ESTIMATION ERRORS DUE TO GUARD SUBBANDS

CLAIM OF PRIORITY UNDER 35 U.S.C. §119

The present Application for Patent claims priority to Provisional Application Ser. No. 60/618,345, entitled "LLR Scaling for OFDM Transmissions Overlaid in TDM Systems," filed Oct. 12, 2004, assigned to the assignee hereof, and expressly incorporated herein by reference.

BACKGROUND

I. Field

The present disclosure relates generally to communication, and more specifically to techniques for performing data detection and decoding in a communication system.

II. Background

A communication system may utilize multiple frequency subbands for data and pilot transmission. These subbands may also be called tones, subcarriers, bins, and so on and may be obtained with orthogonal frequency division multiplexing (OFDM) or some other modulation techniques. With OFDM, each subband is associated with a respective subcarrier that may be modulated with traffic data or pilot. Pilot is data that is known a priori by both a transmitter and a receiver. The transmitter typically sends a pilot to allow the receiver to estimate the response of the communication channel between the transmitter and the receiver.

A communication system may not utilize all of the available subbands for transmission. For example, a predetermined number of subbands at each of the two band edges may be used as guard subbands to allow the system to meet spectral mask requirements. No transmissions are sent on the guard subbands, and data and pilot may be sent on the remaining usable subbands.

The guard subbands typically have a negative effect on channel estimation since no useful information is sent on these subbands. A degraded channel estimate due to the guard subbands may adversely impact data detection and decoding for data sent on the usable subbands.

There is therefore a need in the art for techniques to account for the negative effects due to the guard subbands.

SUMMARY

Techniques for performing data detection and decoding in a manner to account for guard subbands are described herein. According to an embodiment of the invention, an apparatus is described which includes at least one processor and a memory. The processor(s) derive estimates of noise and estimation errors due to at least one pilot subband being zeroed-out and not used for pilot transmission. The processor(s) compute log likelihood ratios (LLRs) using the estimates of the noise and estimation errors.

According to another embodiment, a method is provided in which estimates of noise and estimation errors due to at least one zeroed-out pilot subband are derived. LLRs are then computed using the estimates of the noise and estimation errors.

According to yet another embodiment, an apparatus is described which includes means for deriving estimates of noise and estimation errors due to at least one zeroed-out pilot subband and means for computing LLRs using the estimates of the noise and estimation errors.

According to yet another embodiment, an apparatus is described which includes at least one processor and a memory. The processor(s) obtain received pilot symbols for pilot subbands and received data symbols for data subbands. The processor(s) then derive channel estimates based on the received pilot symbols and at least one zero for at least one zeroed-out pilot subband. The processor(s) perform data detection on the received data symbols with the channel estimates to obtain data symbol estimates, derive estimates of noise and estimation errors due to the at least one zeroed-out pilot subband, and compute LLRs based on the data symbol estimates, the channel estimates, and the estimates of the noise and estimation errors.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The receiver processing techniques described herein may be used for various communication systems such as an OFDM system, an orthogonal frequency division multiple access (OFDMA) system, a single-carrier frequency division multiple access (SC-FDMA) system, and so on. An OFDMA system utilizes OFDM. An SC-FDMA system may utilize interleaved FDMA (IFDMA) to transmit on subbands that are distributed across the system bandwidth, localized FDMA (LFDMA) to transmit on a block of adjacent subbands, or enhanced FDMA (EFDMA) to transmit on multiple blocks of adjacent subbands. In general, modulation symbols are sent in the frequency domain with OFDM and in the time domain with SC-FDMA.

Figure 1:
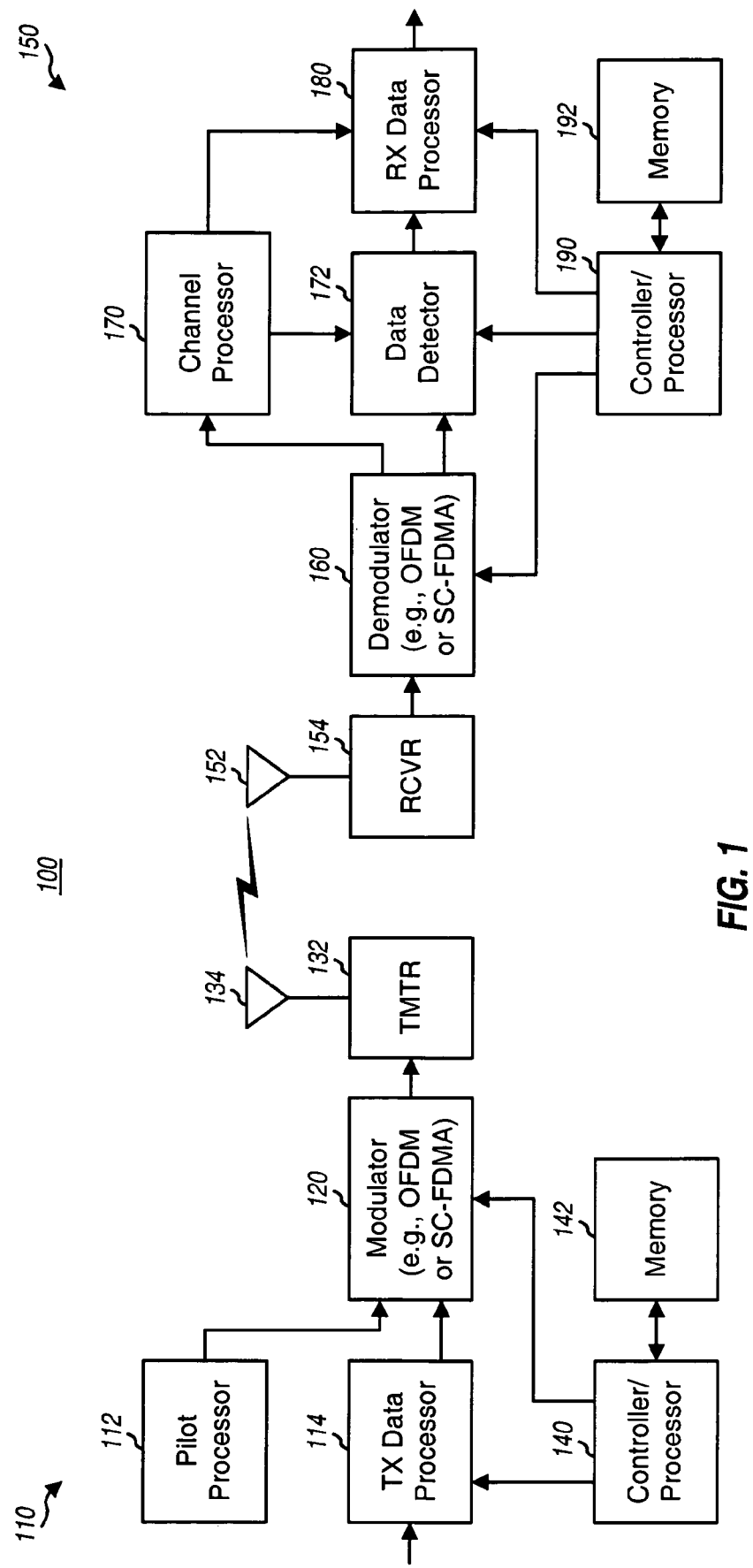
FIG. 1 shows a block diagram of a transmitter and a receiver.

FIG. 1 shows a block diagram of a transmitter 110 and a receiver 150 in a wireless communication system 100. For simplicity, transmitter 110 and receiver 150 are each equipped with a single antenna. For the downlink (or forward link), transmitter 110 may be part of a base station, and receiver 150 may be part of a terminal. For the uplink (or reverse link), transmitter 110 may be part of a terminal, and receiver 150 may be part of a base station. A base station is generally a fixed station and may also be called a base transceiver system (BTS), an access point, a Node B, or some other terminology. A terminal may be fixed or mobile and may be a wireless device, a cellular phone, a personal digital assistant (PDA), a wireless modem card, and so on.

At transmitter 110, a pilot processor 112 generates pilot symbols. A transmit (TX) data processor 114 processes (e.g., encodes, interleaves, and symbol maps) traffic data and generates data symbols. As used herein, a data symbol is a modulation symbol for data, a pilot symbol is a modulation symbol for pilot, a modulation symbol is a complex value for a point in a signal constellation (e.g., for PSK or QAM), and a symbol is a complex value. A modulator 120 receives and multiplexes the data symbols and pilot symbols, performs modulation (e.g., for OFDM or SC-FDMA) on the multiplexed data and pilot symbols, and generates transmission symbols. A transmitter unit (TMTR) 132 processes (e.g., converts to analog, amplifies, filters, and frequency upconverts) the transmission symbols and generates a radio frequency (RF) modulated signal, which is transmitted via an antenna 134.

At receiver 150, an antenna 152 receives the RF modulated signal from transmitter 110 and provides a received signal to a receiver unit (RCVR) 154. Receiver unit 154 conditions (e.g., filters, amplifies, frequency downconverts, and digitizes) the received signal and provides input samples. A demodulator 160 performs demodulation (e.g., for OFDM or SC-FDMA) on the input samples to obtain received symbols. Demodulator 160 provides received pilot symbols to a channel processor 170 and provides received data symbols to a data detector 172. Channel processor 170 derives channel estimates for the wireless channel between transmitter 110 and receiver 150 and estimates of noise and estimation errors based on the received pilot symbols. Data detector 172 performs data detection (e.g., equalization or matched filtering) on the received data symbols with the channel estimates and provides data symbol estimates, which are estimates of the data symbols sent by transmitter 110. An RX data processor 180 processes (e.g., symbol demaps, deinterleaves, and decodes) the data symbol estimates and provides decoded data. In general, the processing at receiver 150 is complementary to the processing at transmitter 110.

Controllers/processors 140 and 190 direct the operation of various processing units at transmitter 110 and receiver 150, respectively. Memories 142 and 192 store program codes and data for transmitter 110 and receiver 150, respectively.

Figure 2:
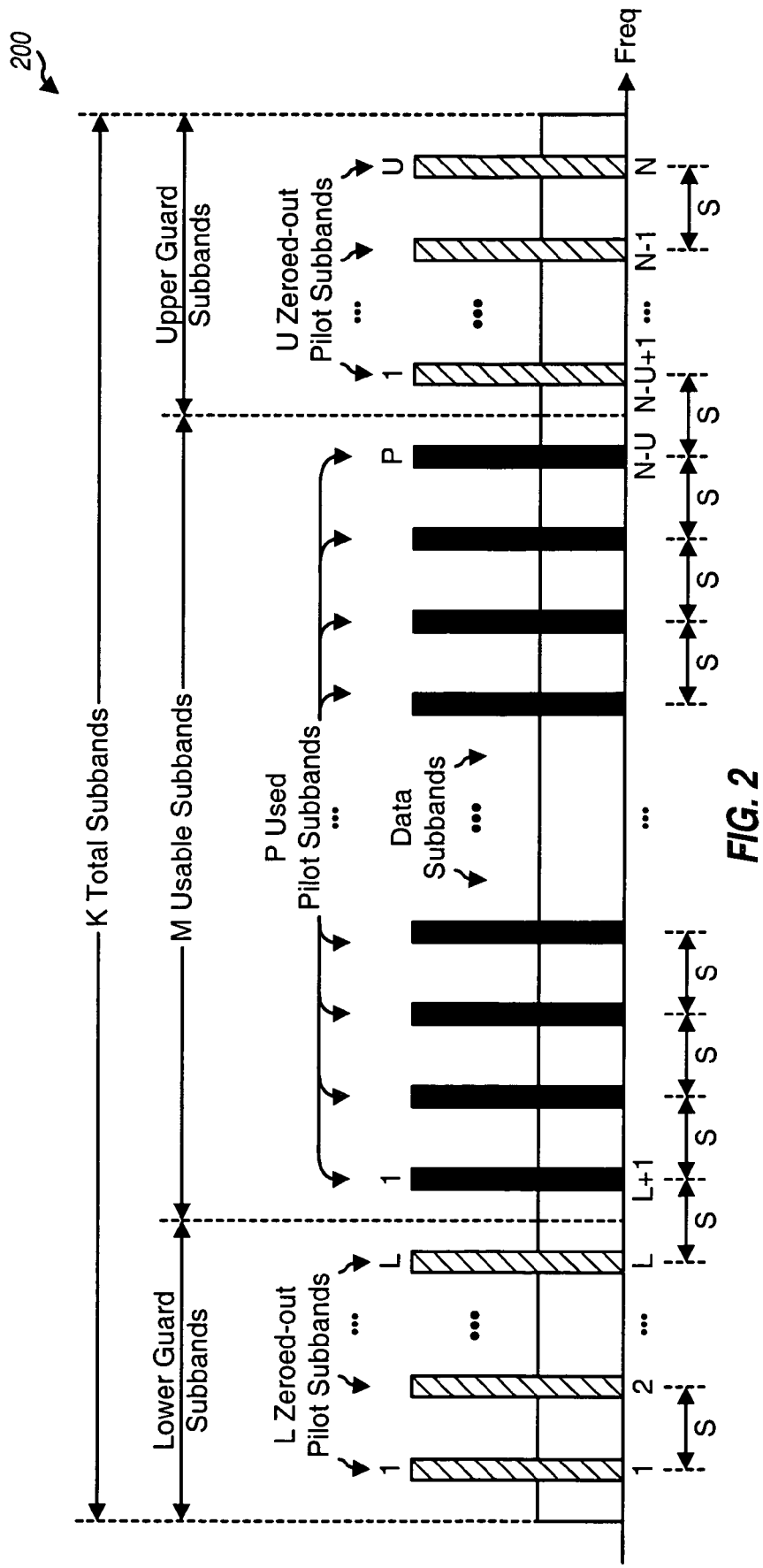
FIG. 2 shows an exemplary subband structure for data and pilot transmission.

FIG. 2 shows an exemplary subband structure 200 that may be used for system 100. The system has an overall system bandwidth of BW MHz, which is partitioned into multiple (K) orthogonal subbands. K may be any integer value but is typically a power of two (e.g., 64, 128, 256, 512, 1024, and so on) in order to simplify the transformation between the time and frequency domains. The spacing between adjacent subbands is BW/K MHz.

In a spectrally shaped system, G subbands are not used for transmission and serve as guard subbands to allow the system to meet spectral mask requirements, where typically G>1. The G guard subbands are often distributed such that approximately G/2 guard subbands are at the lower band edge (which are called lower guard subbands) and approximately G/2 guard subbands are at the upper band edge (which are called upper guard subbands). The remaining M subbands may be used for transmission and are called usable subbands, where M=K−G. As used herein, a data subband is a subband used for data transmission, and a pilot subband is a subband used for pilot transmission. A given subband may be used as a pilot subband in one symbol period and as a data subband in another symbol period.

To facilitate channel estimation, a pilot may be transmitted on subbands that are uniformly distributed across the entire system bandwidth. A set of N subbands may be defined such that consecutive subbands in the set are spaced apart by S subbands, where K=S·N. Some of the subbands in this set may be among the lower guard subbands and would not be used for pilot transmission, and some other subbands in the set may be among the upper guard subbands and would also not be used for pilot transmission. For the example shown in FIG. 2, the first L subbands in the set are not used for pilot transmission and are called zeroed-out pilot subbands, the next P subbands in the set are used for pilot transmission and are called used pilot subbands, and the last U subbands in the set are zeroed-out pilot subbands, where N=L+P+U.

Data and pilot may be sent on the usable subbands using OFDM or SC-FDMA. An OFDM symbol may be generated as follows. Up to M modulation symbols may be mapped to the M usable subbands and zero symbols with signal value of zero are mapped to the remaining subbands. A K-point inverse fast Fourier transform (IFFT) or a K-point inverse discrete Fourier transform (IDFT) is performed on the K modulation symbols and zero symbols to obtain a sequence of K time-domain samples. The last C samples in the sequence are copied to the start of the sequence to form an OFDM symbol that contains K+C samples. The C copied samples are often called a cyclic prefix or a guard interval, and C is the cyclic prefix length. The cyclic prefix is used to combat intersymbol interference (ISI) caused by frequency selective fading, which is a frequency response that varies across the system bandwidth.

An SC-FDMA symbol may be generated as follows. T modulation symbols to be sent on T subbands are transformed to the frequency domain with a T-point fast Fourier transform (FFT) or a T-point discrete Fourier transform (DFT) to obtain T frequency-domain symbols, where T may be equal to N and in general $T \leq M$. The T frequency-domain symbols are mapped to the T subbands used for transmission, and zero symbols are mapped to the K−T remaining subbands. A K-point IFFF/IDFT is then performed on the K frequency-domain symbols and zero symbols to obtain a sequence of K time-domain samples. The last C samples in the sequence are copied to the start of the sequence to form an SC-FDMA symbol that contains K+C samples.

A transmission symbol may be an OFDM symbol or an SC-FDMA symbol. The K+C samples of a transmission symbol are transmitted in K+C sample/chip periods. A symbol period is the duration of one transmission symbol and is equal to K+C sample/chip periods. In general, a transmission symbol may contain any information (e.g., traffic data and/or pilot) on any number of subbands and any one of the usable subbands.

Table 1 shows exemplary values for various system parameters described above. In general, a system may utilize any values for these parameters.

TABLE 1

Exemplary Parameter Values

| Parameter | Notation | Value |
|---|---|---|
| Total number of subbands | K | 1024 |
| Number of guard subbands | G | 136 |
| Number of usable subbands | M | 888 |
| Total number of pilot subbands | N | 128 |
| Number of used pilot subbands | P | 111 |
| Number of zeroed-out pilot subbands in lower band edge | L | 9 |
| Number of zeroed-out pilot subbands in upper band edge | U | 8 |
| Cyclic prefix length & channel impulse response length | C | 108 |

As noted above, the receiver processing techniques may be used for various communication systems and for the downlink as well as the uplink. For clarity, the techniques are described below for an OFDM-based system. In the following description, vectors are denoted by bolded and underlined texts with subscript indicating the vector length, e.g., $\underline{h}_N$ for an N×1 vector or $\underline{H}_K$ for a K×1 vector, where the "×1" is implicit and omitted for clarity. Matrices are denoted by bolded and underlined texts with subscript indicating the matrix dimension, e.g., $W_{P \times N}$ for a P×N matrix. Time-domain vectors are generally denoted with lower case texts (e.g., $h_K$) and frequency-domain vectors are generally denoted with upper case texts (e.g., $H_K$).

The wireless channel between transmitter 110 and receiver 150 may be characterized by either a time-domain channel impulse response or a corresponding frequency-domain channel frequency response. The channel frequency response is the FFF/DFT of the channel impulse response. This relationship may be expressed in matrix form as follows:

$$\underline{H}_K = \underline{W}_{K \times K} \cdot \underline{h}_K, \quad \text{Eq (1)}$$

where $\underline{h}_K$ is a K×1 vector for the impulse response of the wireless channel;
  $\underline{H}_K$ is a K×1 vector for the frequency response of the wireless channel; and
  $\underline{W}_{K \times K}$ is a K×K Fourier matrix.

The Fourier matrix $\underline{W}_{K \times K}$ is defined such that the element in the n-th row and m-th column is given as:

$$w_{n,m} = e^{-j2\pi \frac{(n-1)\cdot(m-1)}{K}}, \quad \text{for } n = 1, \ldots, K \text{ and } m = 1, \ldots, K. \quad \text{Eq (2)}$$

For simplicity, the channel impulse response is assumed to be equal to or shorter than the cyclic prefix length. This condition ensures that the K total subbands are orthogonal to one another. The time-domain vector $\underline{h}_K$ may then be defined as:

$$\underline{h}_K = \begin{pmatrix} \underline{h}_C \\ \underline{0}_{K-C} \end{pmatrix}, \quad \text{Eq (3)}$$

where $\underline{h}_C$ is a C×1 vector for the channel impulse response without excess delay; and
  $\underline{0}_{K-C}$ is a (K−C)×1 vector containing all zeros.

Transmitter 110 transmits data and pilot symbols on the usable subbands to receiver 150. The data and pilot symbols may be assumed to have an average energy of $E_s$, or $E\{|X(k)|^2\} = E_s$, where $E\{\}$ denotes an expectation operation and $X(k)$ is a symbol transmitted on subband k. For simplicity, the following description assumes that each symbol is transmitted at unit power so that $E_s = 1$.

The received symbols obtained by receiver 150 may be expressed as:

$$\underline{Y}_K = \underline{H}_K \circ \underline{X}_K + \underline{\eta}_K, \quad \text{Eq (4)}$$

where $\underline{X}_K$ is a K×1 vector containing the transmitted symbols for the K subbands;
  $\underline{Y}_K$ is a K×1 vector containing the received symbols for the K subbands;
  $\underline{\eta}_K$ is a K×1 vector of noise and interference for the K subbands; and
  "∘" denotes an element-wise product.

Equation (4) assumes that the channel response is constant over a symbol period and that Doppler is sufficiently low so that there is no inter-chip interference (ICI). Equation (4) further assumes that the channel impulse response is shorter than the cyclic prefix so that there is no inter-symbol interference (ISI). Each entry of $\underline{X}_K$ may be a data symbol for a data subband, a pilot symbol for a pilot subband, or a zero symbol for an unused subband (e.g., a guard subband). The data symbols may be assumed to be independent with zero mean so that a covariance matrix of $\underline{X}_K$ may be given as $\underline{C}_{XX} = E\{\underline{X}_K \cdot \underline{X}_K^H\} = \underline{I}_{K \times K}$, where "$H$" denotes a conjugate transpose and $\underline{I}_{K \times K}$ is a K×K identity matrix. The noise and interference may be assumed to be additive white Gaussian noise (AWGN) with a zero mean vector and a covariance matrix of $E\{\underline{\eta}_K \cdot \underline{\eta}_K^H\} = N_0 \cdot \underline{I}_{K \times K}$, where $N_0$ is the variance of the noise. Each entry of $\underline{\eta}_K$ is a zero-mean complex Gaussian random variable with variance of $N_0$. For simplicity, the noise and interference is referred to as simply "noise" in the following description.

If all N pilot subbands are usable for pilot transmission, then the received pilot symbols may be expressed as:

$$\underline{Y}_N = \underline{H}_N \circ \underline{X}_N + \underline{\eta}_N, \quad \text{Eq (5)}$$
$$= \underline{H}_N + \underline{\eta}_N,$$
$$= \underline{W}_{N \times N} \cdot \underline{h}_N + \underline{\eta}_N,$$

where $\underline{X}_N$ is an N×1 vector containing the transmitted pilot symbols;
  $\underline{Y}_N$ is an N×1 vector containing the received pilot symbols;

$$\underline{h}_N = \begin{pmatrix} \underline{h}_C \\ \underline{0}_{N-C} \end{pmatrix}$$

is an N×1 vector for a zero-padded channel impulse response; and
  $\underline{\eta}_N$ is an N×1 vector of noise for the N pilot subbands.

For simplicity, the second equality in equation (5) assumes that each of the pilot symbols has a complex value of 1+j0 and a magnitude of $\sqrt{E_s} = 1$. In this case, the received pilot symbols are simply noisy versions of the channel gains in $\underline{H}_N$, which are equal to the time-domain channel impulse response $\underline{h}_N$ transformed to the frequency domain by the Fourier matrix $\underline{W}_{N \times N}$, as shown by the third equality in equation (5).

Various techniques may be used to estimate the channel impulse response based on the received pilot symbols. These techniques include a least-squares (LS) technique, a minimum mean square error (MMSE) technique, a robust MMSE technique, a zero-forcing (ZF) technique, and so on.

A least-squares channel impulse response estimate $\hat{\underline{h}}_N^{ls}$ may be derived as:

$$\hat{\underline{h}}_N^{ls} = \underline{W}_{N \times N}^{-1} \times \underline{Y}_N, \quad \text{Eq (6)}$$
$$= \underline{W}_{N \times N}^{-1} \cdot (\underline{W}_{N \times N} \cdot \underline{h}_N + \underline{\eta}_N),$$
$$= \underline{h}_N + \underline{W}_{N \times N}^{-1} \cdot \underline{\eta}_N,$$

where $$\underline{W}_{N \times N}^{-1} = \frac{1}{N} \cdot \underline{W}_{N \times N}^H.$$

Equation (6) indicates that the least-squares channel impulse response estimate may be obtained by simply taking an N-point IFFT/IDFT of the received pilot symbols in $\underline{Y}_N$.

An MMSE channel impulse response estimate $\hat{\underline{h}}_N^{mmse}$ may be derived as:

$$\hat{\underline{h}}_N^{mmse} = \underline{\Psi}_{hh} \cdot \underline{W}_{N \times N}^{-1} \cdot [\underline{W}_{N \times N} \cdot \underline{\Psi}_{hh} \cdot \underline{W}_{N \times N}^{-1} + \underline{\Lambda}_{m}]^{-1} \cdot \underline{Y}_N, \quad \text{Eq (7)}$$

where $\Psi_{hh} = E\{\underline{h}_N \cdot \underline{h}_N^H\}$ is the autocovariance of the channel impulse response; and $\Lambda_{\eta\eta} = E\{\underline{\eta}_N \cdot \underline{\eta}_N^H\}$ is the autocovariance of the noise for the pilot subbands.

A robust MMSE channel impulse response estimate $\underline{\hat{h}}_N^{rmmse}$ may be derived as:

$$\hat{\underline{h}}_N^{rmmse} = \frac{1}{1+N_0} \cdot \underline{W}_{N \times N}^{-1} \cdot \underline{Y}_N. \qquad \text{Eq (8)}$$

Equation (8) assumes that (a) the taps in the channel impulse response are uncorrelated and have equal power, so that $\Psi_{hh} = \underline{I}_{N \times N}$, and (b) the noise $\underline{\eta}_N$ is AWGN, so that $\Lambda_{\eta\eta} = N_0 \cdot \underline{I}_{N \times N}$.

The receiver processing techniques described herein may be used in combination with any channel estimation technique. For clarity, the techniques are described below for the least-squares technique and assume that the least-squares channel impulse response estimate $\hat{\underline{h}}_N^{ls}$ is derived. The superscript "$ls$" omitted in the following description for clarity.

A full channel frequency response estimate $\hat{\underline{H}}_K$ for all K total subbands may be obtained by (1) zero padding the least-squares channel impulse response estimate to length K and (2) taking a K-point FFT/DFF of the zero-padded channel impulse response estimate, as follows:

$$\hat{\underline{H}}_K = \underline{W}_{K \times K} \cdot \begin{pmatrix} \hat{\underline{h}}_N \\ \underline{0}_{K-N} \end{pmatrix}, \qquad \text{Eq (9)}$$

$$= \underline{W}_{K \times K} \cdot \begin{pmatrix} \underline{h}_N \\ \underline{0}_{K-N} \end{pmatrix} + \underline{W}_{K \times K} \cdot \begin{pmatrix} \underline{W}_{N \times N}^{-1} \cdot \underline{\eta}_N \\ \underline{0}_{K-N} \end{pmatrix}$$

$$= \underline{H}_K + \underline{W}_{K \times K} \cdot \begin{pmatrix} \underline{W}_{N \times N}^{-1} \cdot \underline{\eta}_N \\ \underline{0}_{K-N} \end{pmatrix}.$$

where $$\underline{H}_K = \underline{W}_{K \times K} \cdot \begin{pmatrix} \underline{h}_N \\ \underline{0}_{K-N} \end{pmatrix}$$

since the channel impulse response is assumed to be shorter than the cyclic prefix.

If only P pilot subbands are used for pilot transmission, as shown in FIG. 2, then the received pilot symbols for the P used pilot symbols may be expressed as:

$$\underline{Y}_P = \underline{W}_{P \times N} \cdot \underline{h}_N + \underline{\eta}_P \qquad \text{Eq (10)}$$

where $\underline{Y}_P$ is a P×1 vector with received pilot symbols for the P used pilot subbands;

$\underline{W}_{P \times N}$ is a P×N submatrix of $\underline{W}_{N \times N}$ and $\underline{\eta}_P$ is a P×1 vector of noise for the P used pilot subbands.

$\underline{W}_{P \times N}$ contains P rows of $\underline{W}_{N \times N}$ corresponding to the P used pilot subbands. For the example shown in FIG. 2, $\underline{W}_{P \times N}$ contains rows L+1 through N−U of $\underline{W}_{N \times N}$.

Receiver 150 may fill the zeroed-out pilot subbands with zero symbols to obtain an N×1 zero-filled received vector $\tilde{\underline{Y}}_N$, which may be expressed as:

$$\tilde{\underline{Y}}_N = \begin{pmatrix} \underline{0}_L \\ \underline{Y}_P \\ \underline{0}_U \end{pmatrix} = \begin{pmatrix} \underline{0}_{L \times N} \\ \underline{W}_{P \times N} \\ \underline{0}_{U \times N} \end{pmatrix} \cdot \underline{h}_N + \begin{pmatrix} \underline{0}_L \\ \underline{\eta}_P \\ \underline{0}_U \end{pmatrix}. \qquad \text{Eq (11)}$$

Equation (11) may be expanded as follows:

$$\tilde{\underline{Y}}_N = \left( \underline{W}_{N \times N} - \begin{pmatrix} \underline{W}_{L \times N} \\ \underline{0}_{P \times N} \\ \underline{W}_{U \times N} \end{pmatrix} \right) \cdot \underline{h}_N + \begin{pmatrix} \underline{0}_L \\ \underline{\eta}_P \\ \underline{0}_U \end{pmatrix}, \qquad \text{Eq (12)}$$

$$= \underline{W}_{N \times N} \cdot \underline{h}_N - \begin{pmatrix} \underline{W}_{L \times N} \\ \underline{0}_{P \times N} \\ \underline{W}_{U \times N} \end{pmatrix} \cdot \underline{h}_N + \begin{pmatrix} \underline{0}_L \\ \underline{\eta}_P \\ \underline{0}_U \end{pmatrix},$$

$$= \underline{W}_{N \times N} \cdot \underline{h}_N + \tilde{\underline{\eta}}_N, \quad \text{where}$$

$$\tilde{\underline{\eta}}_N = \underline{\varepsilon}_N + \breve{\underline{\eta}}_N; \qquad \text{Eq (13)}$$

$$\underline{\varepsilon}_N = -\begin{pmatrix} \underline{W}_{L \times N} \\ \underline{0}_{P \times N} \\ \underline{W}_{U \times N} \end{pmatrix} \cdot \underline{h}_N = -\underline{Q}_{N \times N} \cdot \underline{h}_N, \text{ with } \underline{Q}_{N \times N} = \begin{pmatrix} \underline{W}_{L \times N} \\ \underline{0}_{P \times N} \\ \underline{W}_{U \times N} \end{pmatrix}; \qquad \text{Eq (14)}$$

$$\breve{\underline{\eta}}_N = \begin{pmatrix} \underline{0}_{L \times N} \\ \underline{I}_{P \times N} \\ \underline{0}_{U \times N} \end{pmatrix} \cdot \underline{\eta}_N = \underline{B}_{N \times N} \cdot \underline{\eta}_N, \text{ with } \underline{B}_{N \times N} = \begin{pmatrix} \underline{0}_{L \times N} \\ \underline{I}_{P \times N} \\ \underline{0}_{U \times N} \end{pmatrix}; \qquad \text{Eq (15)}$$

$\underline{W}_{L \times N}$ is an L×N matrix containing the first L rows of $\underline{W}_{N \times N}$ corresponding to the L zeroed-out pilot subbands in the lower band edge; and $\underline{W}_{U \times N}$ is a U×N matrix containing the last U rows of $\underline{W}_{N \times N}$ corresponding to the U zeroed-out pilot subbands in the upper band edge.

Vector $\tilde{\underline{\eta}}_N$ includes the noise and estimation errors for the N subbands for the zero-filled least-squares (ZoLS) channel impulse response estimate, which is a channel impulse response estimate obtained using the least-squares technique with the zeroed-out pilot subbands filled with zeros. Vector $\underline{\varepsilon}_N$ includes an aliasing term introduced by ZoLS, and matrix $\underline{Q}_{N \times N}$ is responsible for the aliasing. In general, vector $\underline{\varepsilon}_N$ may be different for different channel estimation techniques and may be derived for other channel estimation techniques by one skilled in the art.

A full channel frequency response estimate $\tilde{\underline{H}}_K$ for all K total subbands may be obtained by zero-padding vector $\tilde{\underline{Y}}_N$ to length K and taking a K-point FFT/DFF of the zero-padded vector, e.g., as shown in equation (9).

To summarize, the received pilot symbols $\underline{Y}_N$ without zeroed-out pilot subbands and the received pilot symbols $\tilde{\underline{Y}}_N$ with zeroed-out pilot subbands may be given as:

$$\underline{Y}_N = \underline{W}_{N \times N} \cdot \underline{h}_N + \underline{\eta}_N, \text{ and} \qquad \text{Eq(16)}$$

$$\tilde{\underline{Y}}_N = \underline{W}_{N \times N} \cdot \underline{h}_N + \tilde{\underline{\eta}}_N. \qquad \text{Eq (17)}$$

Equations (16) and (17) indicate that the difference between $\underline{Y}_N$ and $\tilde{\underline{Y}}_N$ is the noise terms $\underline{\eta}_N$ and $\tilde{\underline{\eta}}_N$.

The full channel frequency response estimate $\hat{\underline{H}}_K$ without zeroed-out pilot subbands and the full channel frequency response estimate $\tilde{\underline{H}}_K$ with zeroed-out pilot subbands may be given as:

$$\hat{H}_K = H_K + W_{K \times K} \cdot \begin{pmatrix} W_{N \times N}^{-1} \cdot \eta_N \\ 0_{K-N} \end{pmatrix} = H_K + \eta_K, \text{ and} \quad \text{Eq. (18)}$$

$$\tilde{H}_K = H_K + W_{K \times K} \cdot \begin{pmatrix} W_{N \times N}^{-1} \cdot \tilde{\eta}_N \\ 0_{K-N} \end{pmatrix} = H_K + \tilde{\eta}_K, \text{ where} \quad \text{Eq (19)}$$

$$\tilde{\eta}_K = W_{K \times K} \cdot \begin{pmatrix} W_{N \times N}^{-1} \cdot \tilde{\eta}_N \\ 0_{K-N} \end{pmatrix}. \quad \text{Eq (20)}$$

Equations (18) and (19) indicate that the difference between $\hat{H}_K$ and $\tilde{H}_K$ is the noise terms $\eta_K$ and $\tilde{\eta}_K$.

Equation (4) for the received symbols may be rewritten as follows:

$$\begin{aligned} Y_K &= H_K \circ X_K + \eta_K, \\ &= (\hat{H}_K - \tilde{\eta}_K) \circ X_K + \eta_K, \\ &= \hat{H}_K \circ X_K - X_K \circ \tilde{\eta}_K + \eta_K, \\ &= \tilde{H}_K \circ X_K + Z_K, \end{aligned} \quad \text{Eq. (21)}$$

where $Z_K$ is a K×1 vector containing both noise $\eta_K$ and channel estimation errors $-X_K \circ \eta_K$.

Vector $Z_K$ for the noise and estimation errors may be expressed as:

$$\begin{aligned} Z_K &= -X_K \circ \tilde{\eta}_K + \eta_K, \\ &= -X_K \circ W_{K \times K} \cdot \begin{pmatrix} W_{N \times N}^{-1} \cdot \tilde{\eta}_N \\ 0_{K-N} \end{pmatrix} + \eta_K, \\ &= Z_K^{channel} + Z_K^{noise}, \end{aligned} \quad \text{Eq. (22)}$$

where $Z_K^{channel}$ is a channel-related part of $Z_K$ and may be given as:

$$Z_K^{channel} = X_K \circ W_{K \times K} \cdot \begin{pmatrix} W_{N \times N}^{-1} \cdot Q_{N \times N} \\ 0_{(K-N) \times N} \end{pmatrix} \cdot h_N, \quad \text{Eq (23)}$$

and $Z_K^{noise}$ is a noise-related part of $Z_K$ and may be given as:

$$Z_K^{noise} = \eta_K - X_K \circ W_{K \times K} \cdot \begin{pmatrix} W_{N \times N}^{-1} \cdot B_{N \times N} \\ 0_{(K-N) \times N} \end{pmatrix} \cdot \eta_N. \quad \text{Eq (24)}$$

Equation (22) partitions $Z_K$ into the channel-related part $Z_K^{channel}$ and the noise-related part $Z_K^{noise}$. Equations (23) and (24) are obtained by substituting $\tilde{\eta}_N$ in the second equality of equation (22) with the expressions shown in equations (13) through (15) and then expanding the resultant expression. $Z_K^{channel}$ and $Z_K^{noise}$ are not independent since they both contain $X_K$. $Z_K^{channel}$ contains channel estimation errors due to the guard subbands, and $Z_K^{noise}$ contains thermal noise and noise due to channel estimation errors from the guard subbands. Equations (23) and (24) are specific to the least-squares channel impulse response estimate. The channel-related part and the noise-related part may be different for other channel estimation techniques.

Receiver 150 may recover the transmitted symbols in $X_K$ by performing data detection (e.g., equalization) on the received symbols in $Y_K$, as follows:

$$\begin{aligned} U_K &= \tilde{H}_K^* \circ Y_K, \\ &= \|\tilde{H}_K\|^2 \circ X_K + V_K, \end{aligned} \quad \text{Eq (25)}$$

where $U_K$ is a K×1 vector containing data symbol estimates, which are estimates of the transmitted symbols in $X_K$;

$\|\tilde{H}_K\|^2 = \tilde{H}_K^* \circ \tilde{H}_K$ is a K×1 vector containing the squared magnitude of the K channel gains in $\tilde{H}_K$; and $V_K = \tilde{H}_K^* \circ Z_K$ is a K×1 vector of post-detection noise.

Transmitter 110 typically encodes traffic data based on a coding scheme (e.g., a convolutional code or a Turbo code) to generate code bits. Transmitter 110 then interleaves the code bits and symbol maps the interleaved bits to generate data symbols. Each data symbol is generated with B bits, where B may be equal to 1 for BPSK, 2 for QPSK, 3 for 8-PSK, 4 for 16-QAM, and so on.

Receiver 150 performs data detection to obtain vector $U_K$ containing data symbol estimates for the data subbands. Receiver 150 typically computes log likelihood ratios (LLRs) for the bits that make up the data symbols. The LLR for each bit indicates the likelihood of that bit being a one ('1') or a zero ('0'). The LLRs may be obtained based on conditional probabilities prob($Y_K|X_K,\tilde{H}_K$), which means the probability of receiving $Y_K$ given $X_K$ and $\tilde{H}_K$. The exact expression for the conditional probabilities is complicated. The expression may be simplified by approximating $Z_K$ as AWGN. A covariance matrix of $Z_K$ may then be used to compute the LLRs for the data symbols.

The covariance matrix of $Z_K$, $C_{ZZ}$, may be expressed as:

$$C_{ZZ} = E\{[Z_K - E(Z_K)] \cdot [Z_K - E(Z_K)]^H\}. \quad \text{Eq (26)}$$

$Z_K$ may be partitioned into the channel-related part $Z_K^{channel}$ and the noise-related part $Z_K^{noise}$, as shown in equations (22) through (24). The covariance of $Z_K^{channel}$ may be denoted as $C_{ZZ}^{channel}$, and the covariance of $Z_K^{noise}$ may be denoted as $C_{ZZ}^{noise}$. To obtain an upper bound on the covariance of the sum of $Z_K^{channel}$ and $Z_K^{noise}$, these two vectors may be treated as independent vectors, the covariance matrices of $Z_K^{channel}$ and $Z_K^{noise}$ may be determined, and these two covariance matrices may be summed.

For the channel-related part $Z_K^{channel}$, an assumption may be made that all taps of the channel impulse response are independently and identically distributed (i.i.d.) Rayleigh multiplied with a scalar given by a power profile for the channel. A channel power profile is indicative of the long-term time-averaged energy of the channel taps in an impulse response for a wireless channel. With the above assumption, the mean value of all entries in $Z_K^{channel}$ is zero, with the expectation taken over different channel realizations and transmitted symbols.

The main diagonal of $C_{ZZ}^{channel}$ for the data subbands may be given as:

$$\text{diag}(C_{ZZ}^{channel})_{data} = \text{diag}([\Phi \cdot R_{hh} \cdot \Phi^H])_{data}, \quad \text{Eq (27)}$$

where $$\Phi = W_{K \times K} \cdot \begin{pmatrix} W_{N \times N}^{-1} \cdot Q_{N \times N} \\ 0_{(K-N) \times N} \end{pmatrix};$$

and $R_{hh} = E\{h_K \cdot h^H_K\}$ is the autocovariance of the channel impulse response. $R_{hh}$ is a K×K diagonal matrix if the channel taps are independent. The diagonal entries of $R_{hh}$ are given by the channel power profile. $R_{hh}$ may be obtained based on a long-term average of the outer product $\hat{h}_K \cdot \hat{h}^H_K$. Alternatively, the channel taps may be assumed to have equal power, and each of the C leftmost diagonal entries of $R_{hh}$ may be set equal to 1/C to make the overall power gain for the wireless channel equal to one. In equation (27), multiplications of big matrices may be avoided in the computation of $\Phi \cdot R_h^{1/2}$ since a multiplication by $W_{K \times K}$ may be performed with a K-point FFT/DFF and a multiplication by $W_{N \times N}^{-1}$ may be performed with an N-point IFFT/IDFT For the noise-related part $Z_K^{noise}$, the noise vector $\eta_N$ for the N pilot subbands may be given as:

$$\eta_N = I_{N \times K} \eta_K,  \quad \text{Eq (28)}$$

where $I_{N \times K}$ is an N×K matrix containing N ones in N rows, with these N ones being in N columns corresponding to the N pilot subbands. A matrix $\Theta_{K \times K}$ may be defined as:

$$\Theta_{K \times K} = W_{K \times K} \cdot \begin{pmatrix} W_{N \times N}^{-1} \cdot B_{N \times N} \\ 0_{(K-N) \times N} \end{pmatrix} \cdot I_{N \times K}. \quad \text{Eq (29)}$$

Equation (24) may then be rewritten as follows:

$$Z_K^{noise} = (I_{K \times K} - X_K \circ \Theta_{K \times K}) \cdot \eta_K. \quad \text{Eq (30)}$$

Equation (30) indicates that $Z_K^{noise}$ is a product of two independent random quantities—a random matrix $(I_{K \times K} - X_K \circ \Theta_{K \times K})$ and a random Gaussian vector $\eta_K$. Equation (30) may be adjusted for to account for noise reduction due to time filtering. For example, equation (30) may be adjusted by the sum of the squares of the time-filtering coefficients. As an example, matrix $\Theta_{K \times K}$ may be multiplied by a scalar that depends on the time-filtering coefficients.

The noise $\eta_K$ is assumed to be AWGN with a zero-mean vector of $E\{\eta_K\} = 0_K$ and a covariance of $E\{\eta_K \cdot \eta^H_K\} = N_0 \cdot I_{K \times K}$. The noise-related part $Z_K^{noise}$ then has zero mean, or $E\{Z_K^{noise}\} = 0_K$, and a covariance of $C_{XX}^{noise}$, which may be expressed as:

$$C_{ZZ}^{noise} = N_0 \cdot E\{(I_{K \times K} - X_K \circ \Theta_{K \times K}) \cdot (I_{K \times K} - X_K \circ \Theta_{K \times K})^H\}, \quad \text{Eq (31)}$$

$$= N_0 \cdot (I_{K \times K} + \Theta_{K \times K} \cdot \Theta^H_{K \times K}).$$

In equation (31), the first equality may be expanded to obtain four intermediate terms. Two of these intermediate terms, $E\{X_K \circ \Theta_{K \times K} \cdot I_{K \times K}^H\}$ and $E\{I_{K \times K} \cdot (X_K \circ \Theta_{K \times K})^H\}$, are equal to zero because of the multiplication by $X_K$. $C_{ZZ}^{noise}$ contains the two remaining intermediate terms.

Matrix $\Theta_{K \times K}$ may be written in terms of its rows as:

$$\Theta_{K \times K} = \begin{pmatrix} \theta_1 \\ \theta_2 \\ \vdots \\ \theta_K \end{pmatrix}, \quad \text{Eq (32)}$$

where $\theta_k$, for k=1, . . . , K, is a 1×K row vector for the k-th row of $\Theta_{K \times K}$. The covariance of $Z_K^{noise}$ may then be expressed as:

$$C_{ZZ}^{noise} = N_0 \cdot (I_{K \times K} + \text{diag}(\|\theta_1\|^2 \, \|\theta_2\|^2 \ldots \|\theta_K\|^2)). \quad \text{Eq (33)}$$

Equations (15) and (29) through (33) indicate that, for the least-squares channel estimation technique, the covariance of the noise-related part, $C_{ZZ}^{noise}$, is dependent solely on the subband structure, which is defined by $\Theta_{K \times K}$ and $B_{N \times N}$.

The covariance matrix of $Z_K$ may then be expressed as:

$$C_{ZZ} = C_{ZZ}^{channel} + C_{ZZ}^{noise}, \quad \text{Eq (34)}$$

where $C_{ZZ}^{channel}$ and $C_{ZZ}^{noise}$ may be derived as described above for equations (27) and (31), respectively. $C_{ZZ}$ is a K×K diagonal matrix containing the variance of the noise and estimation errors for the K total subbands. The k-th diagonal element of $C_{ZZ}$ is an estimate of the noise and estimation error for subband k. The estimates of the noise and estimation errors may be used to compute the LLRs for the data symbols received on the data subbands.

The received data symbol for each data subband k may be expressed as:

$$Y(k) = H(k) \cdot X(k) + N(k), \quad \text{Eq (35)}$$

where X(k) is a transmitted data symbol for subband k;
Y(k) is a received data symbol for subband k;
H(k) is a complex channel gain for subband k; and
N(k) is the noise for subband k.

The receiver may perform data detection for each subband k as follows:

$$U(k) = \tilde{H}^*(k) \cdot Y(k) \quad \text{Eq (36)}$$

where $\tilde{H}(k)$ is a channel gain for subband k, which is the k-th element of $\tilde{H}_K$; and
U(k) is a data symbol estimate for subband k, which is an estimate of X(k).

Data symbol X(k) is defined by B bits and corresponds to one of $2^B$ possible points in a signal constellation. The receiver may compute an LLR for each of the B bits of data symbol X(k) as follows:

$$LLR_j = \log \frac{\sum_{C: b_j(C)=1} \exp\{-|Y(k) - H(k) \cdot C|^2 / \sigma^2(k)\}}{\sum_{C: b_j(C)=0} \exp\{-|Y(k) - H(k) \cdot C|^2 / \sigma^2(k)\}}, \quad \text{Eq (37)}$$

where $LLR_j$ is the LLR for the j-th bit of data symbol X(k);
C is one of the $2^B$ possible modulation symbols for the signal constellation;
$b_j(C)=1$ denotes that C has '1' for the j-th bit;
$b_j(C)=0$ denotes that C has '0' for the j-th bit; and
$\sigma^2(k)$ is the variance of the noise in N(k).

In equation (37), the summation in the numerator is over all modulation symbols having '1' for the j-th bit, and the summation in the denominator is over all modulation symbols having '0' for the j-th bit. Each of the $2^B$ possible modulation symbols is thus considered in either the numerator or the denominator. For each modulation symbol C, a received symbol estimate is obtained as H(k)·C(k) and subtracted from the received data symbol Y(k), and the resultant error is divided by the noise variance $\sigma^2(k)$. The k-th diagonal element of $C_{ZZ}$ may be used for $\sigma^2(k)$. The LLRs computed for the received data symbols may be decoded in a manner known in the art.

Figure 3:
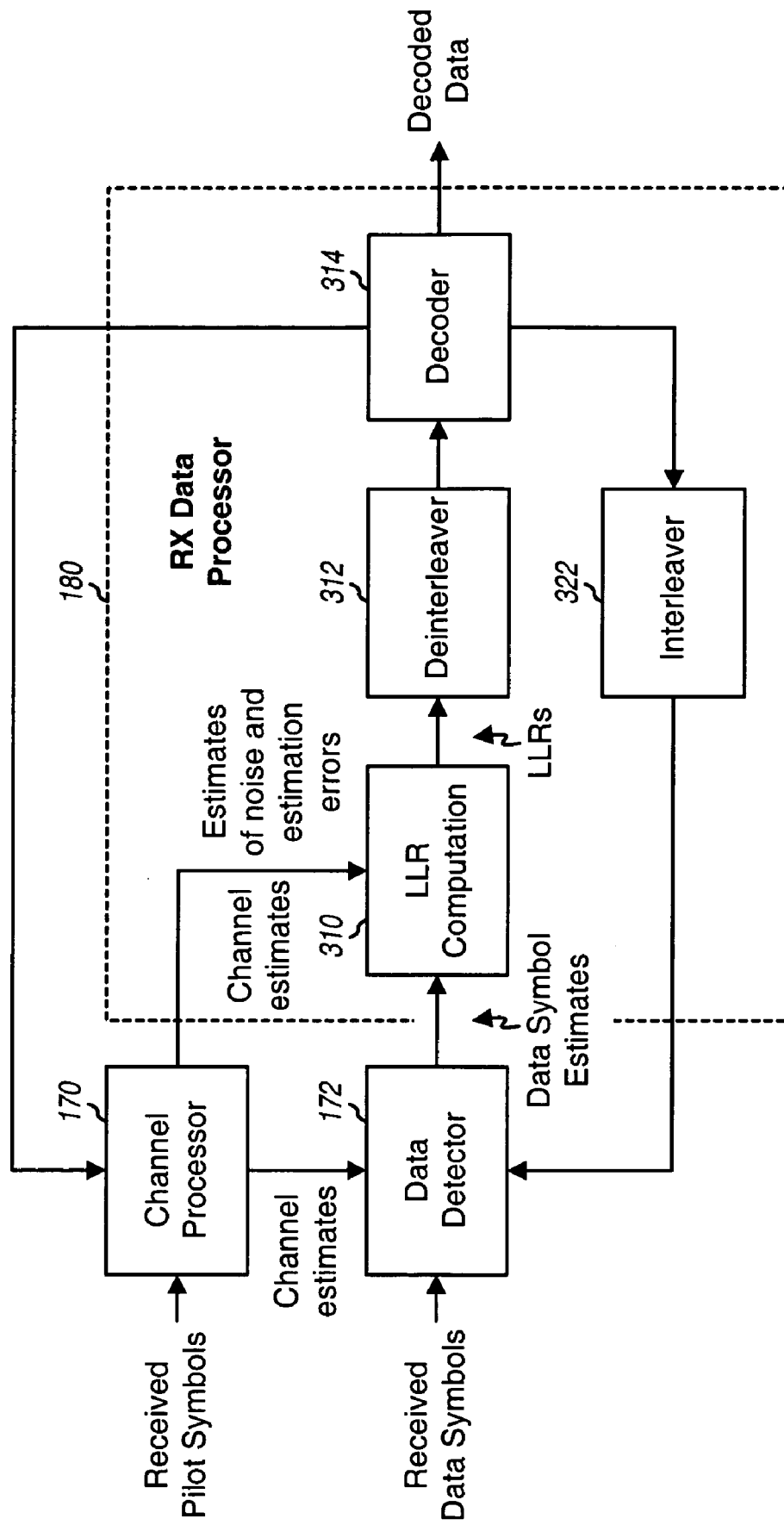
FIG. 3 shows a block diagram of a receive (RX) data processor at the receiver.

FIG. 3 shows a block diagram of an embodiment of RX data processor 180 at receiver 150. Within RX data processor 180, an LLR computation unit 310 receives (1) the data symbol estimates $\underline{U}_K$ from data detector 172 and (2) the channel estimates $\underline{\tilde{H}}_K$ and the estimates of the noise and estimation errors, $C_{ZZ}$, from channel processor 170. Unit 310 computes the LLRs for the code bits of each data symbol estimate based on the received quantities, e.g., as shown in equation (37). A deinterleaver 312 deinterleaves the LLRs from unit 310 in a manner complementary to the interleaving performed by transmitter 110 and provides deinterleaved LLRs. A decoder 314 decodes the deinterleaved LLRs based on the coding scheme used by transmitter 110 and provides decoded data.

Data detector 172 and decoder 314 may perform iterative detection and decoding for multiple iterations to improve performance. For each iteration, decoder 314 provides decoder LLRs, which are interleaved by an interleaver 322 and provided to data detector 172. Data detector 172 derives new data symbol estimates based on the received data symbols, the channel estimates, and the decoder LLRs. The new data symbol estimates are used to compute new LLRs, which are again decoded by decoder 314. The reliability of the data symbol estimates improves with each detection/decoding iteration. After all iterations have been completed, decoder 314 slices the final LLRs to obtain the decoded data.

Channel processor 170 and decoder 314 may also perform iterative channel and noise estimation and decoding for multiple iterations. For each iteration, decoder 314 provides the decoder LLRs to channel processor 170, which derives new channel estimates and/or new estimates of the noise and estimation errors based on the received pilot symbols and the decoder LLRs. The new channel estimates may be used for data detection, and the new channel estimates and/or new estimates of the noise and estimation errors may be used to compute new LLRs.

Figure 4:
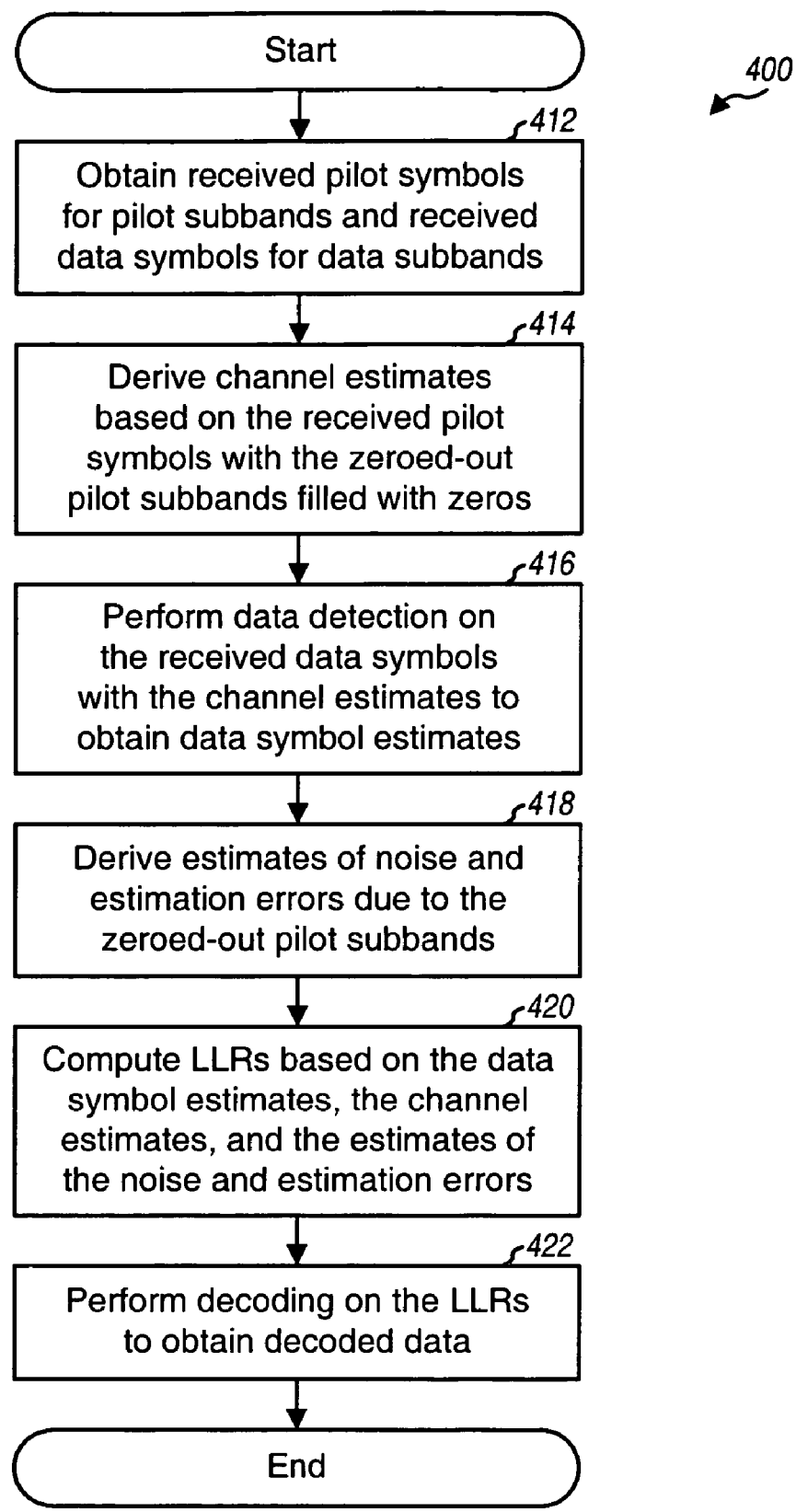
FIG. 4 shows a process performed by the receiver to receive a data transmission.

FIG. 4 shows a process 400 performed by receiver 150 to recover a data transmission sent by transmitter 110. Receiver 150 obtains received pilot symbols for pilot subbands and received data symbols for data subbands (block 412). The received pilot symbols and received data symbols may be obtained by performing demodulation (e.g., for OFDM or SC-FDMA) on the input samples from a receive antenna.

Channel estimates $\underline{\tilde{H}}_K$ are derived based on the received pilot symbols with the zeroed-out pilot subbands filled with zeros (block 414). The channel estimation may be performed using various channel estimation techniques, as described above. Data detection is performed on the received data symbols with the channel estimates to obtain data symbol estimates (block 416). Estimates of noise and estimation errors due to the zeroed-out pilot subbands are derived (block 418). This may be achieved by deriving a first covariance matrix $C_{ZZ}^{channel}$ for the channel-related part of the noise and estimation errors, deriving a second covariance matrix $C_{ZZ}^{noise}$ for the noise-related part of the noise and estimation errors, and deriving a covariance matrix $C_{ZZ}$ for the total noise and estimation errors based on the first and second covariance matrices. For the least-squares channel estimation technique, the first covariance matrix may be derived based on the channel impulse response estimate, and the second covariance matrix may be derived based on the subband structure used for transmission, as described above. In general, the estimates of the noise and estimation errors may be explicitly or implicitly computed.

LLRs are then computed based on the data symbol estimates, the channel estimates, and the estimates of the noise and estimation errors, which are contained in the covariance matrix $C_{ZZ}$ (block 420). The LLRs are deinterleaved and decoded to obtain decoded data for receiver 150 (block 422).

The techniques described herein can calculate LLRs in a manner to account for noise and estimation errors due to zeroed-out pilot subbands, which may improve performance. The zeroed-out pilot subbands typically have an adverse effect on noise and channel estimation and result in estimation errors. The variance of the noise and estimation errors may be derived and used to compute the LLRs, as described above. Computer simulations indicate that a gain of more than 1 decibel (dB) may be achieved for the exemplary OFDM system given above in Table 1 at a frame error rate (FER) of 1%.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, firmware, computer software, or combinations thereof. To clearly illustrate this interchangeability of hardware, firmware and software, various illustrative components, blocks, modules, circuits, and steps have been described above generally in terms of their functionality. Whether such functionality is implemented as hardware, firmware and/or software depends upon the particular application and design constraints imposed on the overall system. Skilled artisans may implement the described functionality in various ways for each particular application, but such implementation decisions should not be interpreted as causing a departure from the scope of the present invention.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA), or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a firmware/software module executed by a processor, or in a combination of the two. A firmware/software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to derive channel estimates based on received pilot symbols, to derive estimates of channel noise and estimation errors due to at least one pilot subband being zeroed-out so that no pilot transmissions are sent by a transmitter on the at least one zeroed-out pilot subband, wherein deriving the estimates comprises replacing at least one received symbol for the at least one zeroed-out pilot subband with zero, and wherein the at least one processor is also configured to perform data detection on received data symbols with the channel estimates to obtain data symbol estimates, and to compute log likelihood ratios (LLRs) for code bits of each of the received data symbol estimate using the data symbol estimates, the channel estimates and the estimates of the channel noise and estimation errors; and
a memory operatively coupled to the at least one processor.

2. The apparatus of claim 1, wherein the at least one processor is configured to obtain the received pilot symbols from a plurality of pilot subbands uniformly distributed across system bandwidth and including the at least one zeroed-out pilot subband.

3. The apparatus of claim 1, wherein the at least one processor is configured to derive the channel estimates based on a least-squares channel estimation technique.

4. The apparatus of claim 1, wherein the at least one processor is configured to derive the channel estimates based on a minimum mean square error (MMSE) technique, a robust MMSE channel estimation technique, or a zero-forcing (ZF) channel estimation technique.

5. The apparatus of claim 1, wherein the at least one processor is configured to derive channel estimates based on a channel estimation technique, to derive the estimates of the noise and estimation errors based on the channel estimation technique, and to compute the LLRs using the data symbol estimates, the channel estimates and the estimates of the noise and estimation errors.

6. The apparatus of claim 1, wherein the at least one processor is configured to derive a channel-related part of the noise and estimation errors, to derive a noise-related part of the noise and estimation errors, and to derive the estimates of the noise and estimation errors based on the channel-related part and the noise-related part.

7. The apparatus of claim 1, wherein the at least one processor is configured to derive a first covariance matrix based on a channel impulse response estimate, to derive a second covariance matrix based on a subband structure used for transmission, to derive a third covariance matrix for the noise and estimation errors based on the first and second covariance matrices, and to compute the LLRs using the third covariance matrix.

8. The apparatus of claim 1, wherein the at least one processor is configured to perform decoding on the LLRs to obtain decoded data.

9. The apparatus of claim 1, wherein the at least one processor is configured to perform demodulation for orthogonal frequency division multiplexing (OFDM) to obtain the received pilot symbols for subbands used for pilot transmission and the received data symbols for subbands used for data transmission.

10. The apparatus of claim 1, wherein the at least one processor is configured to perform demodulation for single-carrier frequency division multiple access (SC-FDMA) to obtain the received pilot symbols for subbands used for pilot transmission and the received data symbols for subbands used for data transmission.

11. A method of processing data, the method comprising:
deriving channel estimates based on received pilot symbols;
performing data detection on received data symbols with the channel estimates to obtain data symbol estimates;
deriving estimates of channel noise and estimation errors due to at least one pilot subband being zeroed-out so that no pilot transmissions are sent by a transmitter on the at least one zeroed-out pilot subband, wherein deriving the estimates comprises replacing at least one received symbol for the at least one zeroed-out pilot subband with zero; and
computing log likelihood ratios (LLRs) for code bits of each of the received data symbol estimate using the data symbol estimates, the channel estimates and the estimates of the noise and estimation errors.

12. The method of claim 11, further comprising:
deriving the channel estimates based on a channel estimation technique, wherein the estimates of the noise and estimation errors are derived based on the channel estimation technique, and wherein the LLRs are computed using the data symbol estimates, the channel estimates and the estimates of the noise and estimation errors.

13. An apparatus comprising:
means for deriving channel estimates based on received pilot symbols;
means for performing data detection on received data symbols with the channel estimates to obtain data symbol estimates;
means for deriving estimates of channel noise and estimation errors due to at least one pilot subband being zeroed-out so that no pilot transmissions are sent by a transmitter on the at least one zeroed-out pilot subband, wherein the means for deriving the estimates comprises means for replacing at least one received symbol for the at least one zeroed-out pilot subband with zero; and
means for computing log likelihood ratios (LLRs) for code bits of each of the received data symbol estimate using the data symbol estimates, the channel estimates and the estimates of the noise and estimation errors.

14. The apparatus of claim 13, further comprising:
means for deriving channel estimates based on a channel estimation technique, and wherein the means for deriving the estimates of the noise and estimation errors comprises means for deriving the estimates of the noise and estimation errors based on the channel estimation technique, and wherein the means for computing the LLRs comprises means for computing the LLRs using the data symbol estimates, the channel estimates and the estimates of the noise and estimation errors.

15. A non-transitory computer-readable medium for processing data, the non-transitory computer-readable medium having instructions thereon, the instructions comprising:
    code for deriving channel estimates based on received pilot symbols;
    code for deriving estimates of channel noise and estimation errors due to at least one pilot subband being zeroed-out so that no pilot transmissions are sent by a transmitter on the at least one zeroed-out pilot subband, wherein the code for deriving the estimates comprises code for replacing at least one received symbol for the at least one zeroed-out pilot subband with zero; and
    code for computing log likelihood ratios (LLRs) for code bits of each received data symbol estimate using the channel estimates and the estimates of the noise and estimation errors.

* * * * *